United States Patent
Hyun et al.

(10) Patent No.: US 11,670,943 B2
(45) Date of Patent: Jun. 6, 2023

(54) POWER CONTROL DEVICE AND CONTROL METHOD THEREOF

(71) Applicant: LG ELECTRONICS INC., Seoul (KR)

(72) Inventors: Seungwook Hyun, Seoul (KR); Sunyoung Park, Seoul (KR); Changjin Lim, Seoul (KR); Jungmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/380,213

(22) Filed: Jul. 20, 2021

(65) Prior Publication Data

US 2022/0209534 A1 Jun. 30, 2022

(30) Foreign Application Priority Data

Dec. 24, 2020 (KR) .................. 10-2020-0183603

(51) Int. Cl.
*H02J 3/12* (2006.01)
*H02J 3/38* (2006.01)

(52) U.S. Cl.
CPC . *H02J 3/12* (2013.01); *H02J 3/38* (2013.01)

(58) Field of Classification Search
CPC ...... H02J 3/12; H02J 3/38; H02J 3/382; H02J 3/383; H02J 3/46; H02J 3/06
See application file for complete search history.

(56) References Cited

U.S. PATENT DOCUMENTS

| 5,576,940 | A | * | 11/1996 | Steigerwald | ...... H02M 3/33523 363/69 |
| 2012/0313442 | A1 | * | 12/2012 | Oh | .......... H02J 3/381 307/43 |
| 2015/0340869 | A1 | * | 11/2015 | Unru | ....... H02J 3/383 307/82 |

FOREIGN PATENT DOCUMENTS

| JP | 6711516 | 6/2020 |
| KR | 20160076377 | 6/2016 |
| KR | 1020160109273 | 9/2016 |
| KR | 101904902 | 10/2018 |
| KR | 102071469 | 1/2020 |
| WO | 2018/201224 | 11/2018 |
| WO | 2019/096367 | 5/2019 |

OTHER PUBLICATIONS

Extended European Search Report in European Application No. 21199662.4, dated Mar. 17, 2022, 7 pages.
Office Action in Korean Appln. No. 10-2020-0183603, dated Jul. 19, 2022, 11 pages (with English translation).
Notice of Allowance in Korean Appln. No. 10-2020-0183603, dated Jan. 10, 2023, 8 pages (with English translation).

* cited by examiner

*Primary Examiner* — Nguyen Tran
(74) *Attorney, Agent, or Firm* — Fish & Richardson P.C.

(57) ABSTRACT

A control method of a power control device includes: receiving power from a power supply, distributing the power to at least one of a plurality of power conversion systems (PCSs), and transferring the power to a load using the at least one PCS. The power is distributed based on a load amount of power of each of the plurality of PCSs.

19 Claims, 6 Drawing Sheets

POWER CONTROL DEVICE AND CONTROL METHOD THEREOF

CROSS-REFERENCE TO RELATED APPLICATION

This application claims the benefit of Korean Patent Application No. 10-2020-0183603 filed on Dec. 24, 2020, the entire disclosure of which are hereby incorporated by reference herein for all purposes.

BACKGROUND OF THE INVENTION

Field of the Invention

The present disclosure relates to a power control device, more specifically, to a power control device for controlling power based on a load amount and a control method thereof.

Description of the Related Art

An energy storage system (ESS) refers to a power storage system that performs power control during system connection, and controls a load voltage through a distribution power function when an independent system voltage is required.

Here, a power conversion system (PCS) of the ESS refers to a system that controls the power transferred to the load in the ESS. There are many cases of parallel operation of single-capacity PCS for capacity increase.

As examples of methods for controlling the PCS, there are a Master-Slave control method for controlling power based on a master module or a master PCS, and a droop control for equal load distribution control based on a droop curve.

In the prior art described above, various techniques have been developed for improving system efficiency in parallel operation.

SUMMARY OF THE INVENTION

An object of the present disclosure is to provide a power control device and a control method thereof for solving the above problems.

In addition, the present disclosure is to provide a power control device and a control method thereof using a non-communication high efficiency parallel operation method of ESS PCS using a droop curve.

A control method of a power control device according to an embodiment of the present disclosure includes receiving power from a power supply; distributing the power to a plurality of power conversion systems (PCSs); and transferring the power to a load using the plurality of PCSs, wherein the distributing the power is distributing the power to at least some PCSs selected based on an amount of the power among the plurality of PCSs.

In addition, the power control device may distribute the power based on non-communication control.

In addition, the power control device may distribute the power using droop control.

In addition, the power control device may apply different droop curves to each of the plurality of PCSs.

In addition, the droop curve may include a resistive droop curve or an inductive droop curve.

In addition, the droop curve may include a linear first droop curve section and a second droop curve section maintaining zero power.

In addition, a number of the plurality of PCSs may be two or more, and the power control device may operate the plurality of PCSs as two or more parallel systems.

In addition, the power control device may be included in an energy storage system (ESS).

In addition, the power control device may be included in an inverter system having one or more phases.

In addition, the power control device may be included in an inverter system having two or more levels.

In addition, during a predetermined first section to a second section, all of the power may be distributed to a first PCS among the plurality of PCSs.

In addition, during the second section to a predetermined third section, power to voltage may be distributed to the first PCS by a first ratio, and the power to the voltage may be distributed to a second PCS among the plurality of PCSs by a second ratio, and during the third section to a predetermined fourth section, the power may be distributed to the first PCS and the second PCS by the same ratio.

In addition, during the fourth section to a predetermined fifth section, the power may be distributed to the first PCS and the second PCS by a third ratio, and the power may be distributed to the third PCS by a fourth ratio lower than the third ratio, and during the fifth section to a predetermined sixth section, the power may be distributed to the first PCS, the second PCS, and the third PCS by the same ratio.

In addition, during the sixth section to a predetermined seventh section, the power may be distributed to the first PCS, the second PCS, and the third PCS by the same fifth ratio, and the power may be distributed to a fourth PCS by a sixth ratio lower than the fifth ratio, and during the seventh section to a predetermined eighth section, the power may be distributed to the first PCS, the second PCS, the third PCS, and the fourth PCS by the same ratio.

A power control device according to another embodiment of the present disclosure includes a power supply; and a processor configured to: receive power from the power supply; distribute the power to a plurality of power conversion systems (PCSs); transfer the power to a load using the plurality of PCSs, wherein the processor distributes the power to at least some PCSs selected based on an amount of the power among the plurality of PCSs.

A control method of a power control device according to another embodiment of the present disclosure includes receiving power from a power supply; selecting at least some power conversion systems (PCSs) based on an amount of the power among a plurality of PCSs; distributing the power to the selected at least some PCSs; and transferring the power to a load using the plurality of PCSs.

According to the power control device and the control method thereof according to the present disclosure, it can improve the system efficiency at a lower load than an existing droop control by performing unbalanced load distribution control through a droop curve during a non-communication independent parallel operation of ESS PCS.

In addition, according to the present disclosure, it is possible to provide a droop curve capable of a high-efficient control technique in parallel operation of the ESS PCS through a droop control.

In addition, according to the present disclosure, system efficiency at light loads (loads below 50% of the rating) can be improved by configuring the droop control to operate only a small number of PCS at a low load using a different droop curve for each group.

In addition, according to the present disclosure, when a low load is applied during parallel operation, a method of non-operating a certain PCS can be standardized based on the load voltage and frequency.

DETAILED DESCRIPTION OF THE EMBODIMENTS

Figure 1:
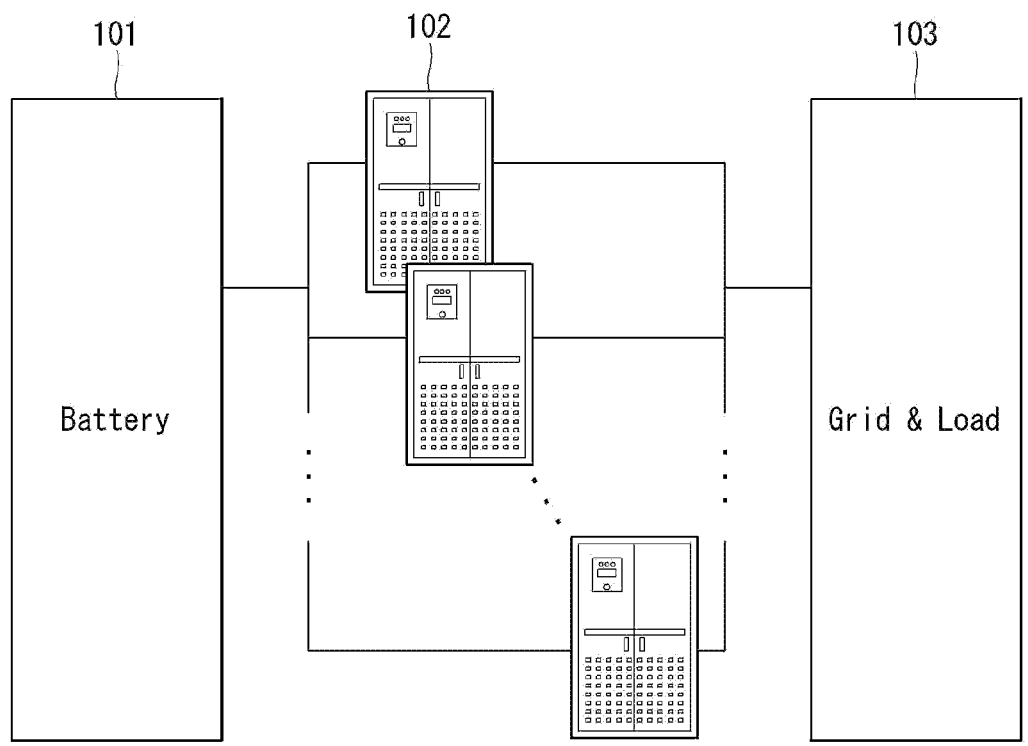
FIG. 1 is a block diagram illustrating an ESS according to an embodiment of the present disclosure.

Hereinafter, with reference to the accompanying drawings will be described in detail an embodiment disclosed in the present disclosure, however, the same or similar components regardless of the reference numerals are given the same reference numerals and redundant description thereof will be omitted.

In describing the embodiments disclosed in the present disclosure, when a component is referred to as being "coupled" or "connected" to another component, it may be directly coupled to or connected to the other component, however, it should be understood that other components may exist in the middle.

In addition, in describing the embodiments disclosed in the present disclosure, when it is determined that the detailed description of the related known technology may obscure the gist of the embodiments disclosed in the present disclosure, the detailed description thereof will be omitted. In addition, the accompanying drawings are only for easily understanding of the embodiments disclosed in the present disclosure, but the technical spirit disclosed in the present disclosure is not limited by the accompanying drawings, and it should be understood that the accompanying drawings include all changes, equivalents, and substitutes included in the spirit and scope of the present disclosure.

On the other hand, the term "disclosure" may be replaced with terms such as document, specification, description.

Energy Storage System (ESS)

Description of FIG. 1

FIG. 1 is a block diagram illustrating an ESS according to an embodiment of the present disclosure.

As shown in FIG. 1, according to an embodiment of the present disclosure, an energy storage system (ESS) may be composed of a power supply (Battery) 101, a plurality of power conversion systems (PCSs) 102 that receives power from the power supply and transfers it to a load, and a load (Grid & Load) 103 that receives the power from the PCS.

Here, in receiving the power from the power supply for the plurality of PCSs, each PCS may be provided with the same power or different powers. In particular, in the present disclosure, each PCS may be provided with different power based on a real-time load amount, and may transfer the provided power to the load.

A detailed description will be described with reference to FIGS. 2 to 6 below.

Figure 2:
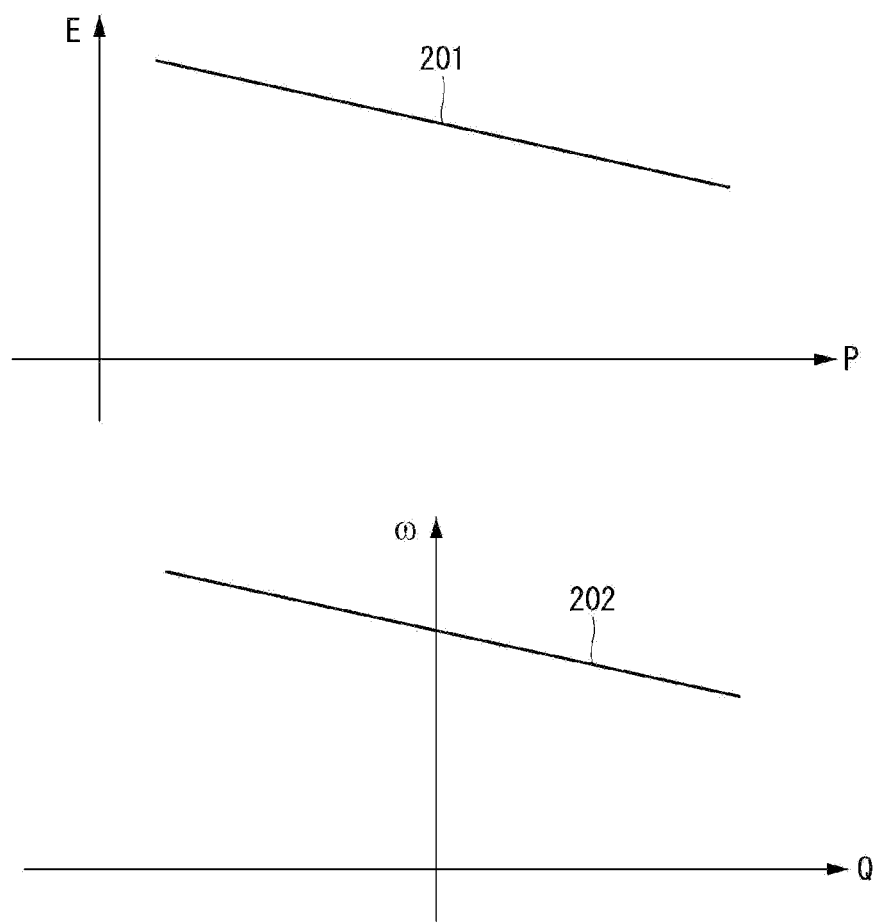
FIG. 2 is a graph illustrating a relationship between powers and bus voltages and frequencies.

Description of FIG. 2

FIG. 2 is a graph illustrating a relationship between powers and bus voltages and frequencies.

As shown in FIG. 2, it can be seen that an active power (P) is in inverse proportion to a bus voltage (E) of the ESS.

In addition, it can be seen that a reactive power (Q) is in inverse proportion to an operating frequency (w) of the ESS.

Problems of Conventional ESS

The ESS is installed and operated for the purpose of a peak power distribution function, which charges when the load power usage is low and discharges when it is high and reducing ripple power caused by new renewable energy generation.

The ESS charges the battery (power) using inexpensive late-night electricity during system connection, and discharges the energy stored in the battery when electricity usage fees increase during peak load, so that the difference in the electricity usage fees generated during the charging and discharging may provide financial benefits to users.

In addition, the ESS also performs a distributed power function that independently supplies power to the load when a system accident (power failure) occurs at the request of the consumer. This independent operation function is applied not only as an alternative to an emergency generator, but also as a solution to construct a micro-grid in an isolated area from the system.

To date, the capacity of industrial products is gradually increasing due to the development of power conversion elements and control devices of the ESS. Accordingly, consumers of the ESS are demanding products of various rated power according to the installation area and use, but it was impossible and inefficient for ESS manufacturers to develop customized products for all requirements.

Accordingly, in order to respond to the sales of various rated ESS products required by consumers, the ESS manufacturers have developed a single product capable of parallel operation and are optimizing the system development cost, parts cost, and installation cost in the form of suggesting the number of parallel units that meet the request of the consumer. In addition, a product with an increased number of parallels can be expected for operating techniques that produce various performances than a single product such as a method that operates with a high efficiency or a method that can tolerate failure of some devices, and so on.

In the case of the prior art, parallel operation may be divided into communication parallel operation using communication and non-communication parallel operation not using communication.

A typical parallel operation technique using communication is Master-Slave control. Here, in the Master-Slave control under the independent operation condition, a device designated as Master controls to maintain the voltage to the load, and devices designated as Slave control to distribute the current of the load by the number of parallel units.

A typical example of a non-communication parallel operation technique is a droop control. The droop control refers to a control in which all devices in parallel operation perform voltage control, and indirectly share distribution power between parallel devices through droop curves of the bus voltage and frequency.

The communication parallel operation has disadvantages of being easy to use only for short-range parallel operation and a problem for communication error, although the dynamic characteristics for variable load are relatively fast.

The non-communication parallel control has the advantage that there is no problem for communication error and operates stably even when the installation distance of the parallel device is long, but has the disadvantage that the dynamic characteristics are relatively slow when the load is varied, and the voltage variable rate is high.

In the case of parallel operation, it is possible to operate the system in various types of operation modes compared to a single system. A typical parallel PCS operation mode is a high-efficient operation technique. The high-efficiency operation technique is a method capable of maintaining high efficiency even in a low load area by varying the number of PCS operating units according to the load amount, and the power control method according to an embodiment of the present disclosure belongs to this.

Figure 3:
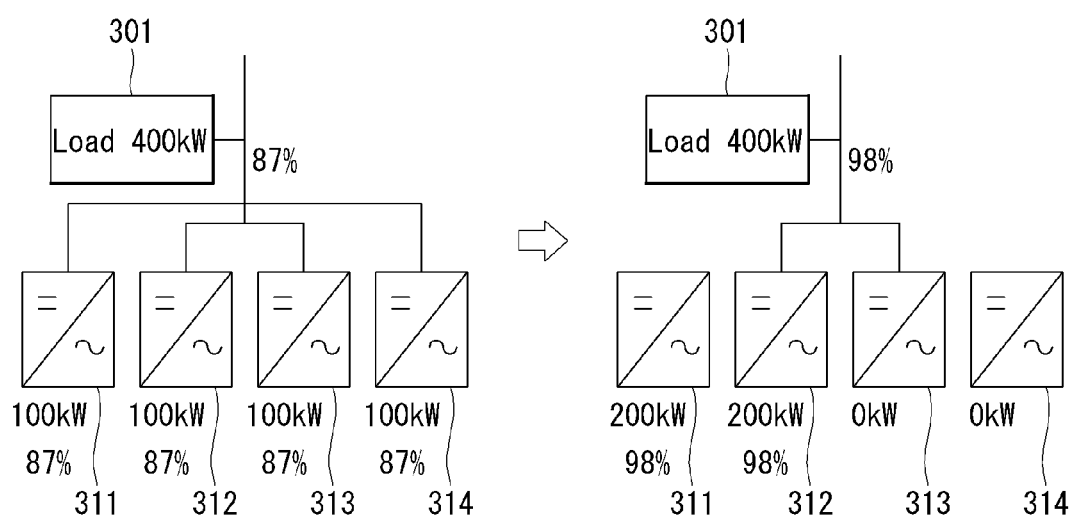
FIG. 3 illustrates system efficiency according to the number of PCS operated compared to the same power.

Description of FIG. 3

FIG. 3 illustrates system efficiency according to the number of PCS operated compared to the same power.

As shown in the left part of FIG. 3, when a load 301 of 400 kW is connected in a situation in which four PCSs 311, 312, 313, and 314 of rated 250 kW are operated in 4 parallel, the power is distributed to each PCS by 2/5 of the total load. In this case, the overall efficiency of the system is shown to be the same as the efficiency at the individual PCS 2/5 load.

On the other hand, as shown in the right part of FIG. 3, when only two PCSs 311 and 312 are operated, a characteristic of operating under 4/5 load conditions is shown based on each PCS, and the overall efficiency is shown to be similar to that of an individual PCS under 4/5 load conditions.

Figure 4:
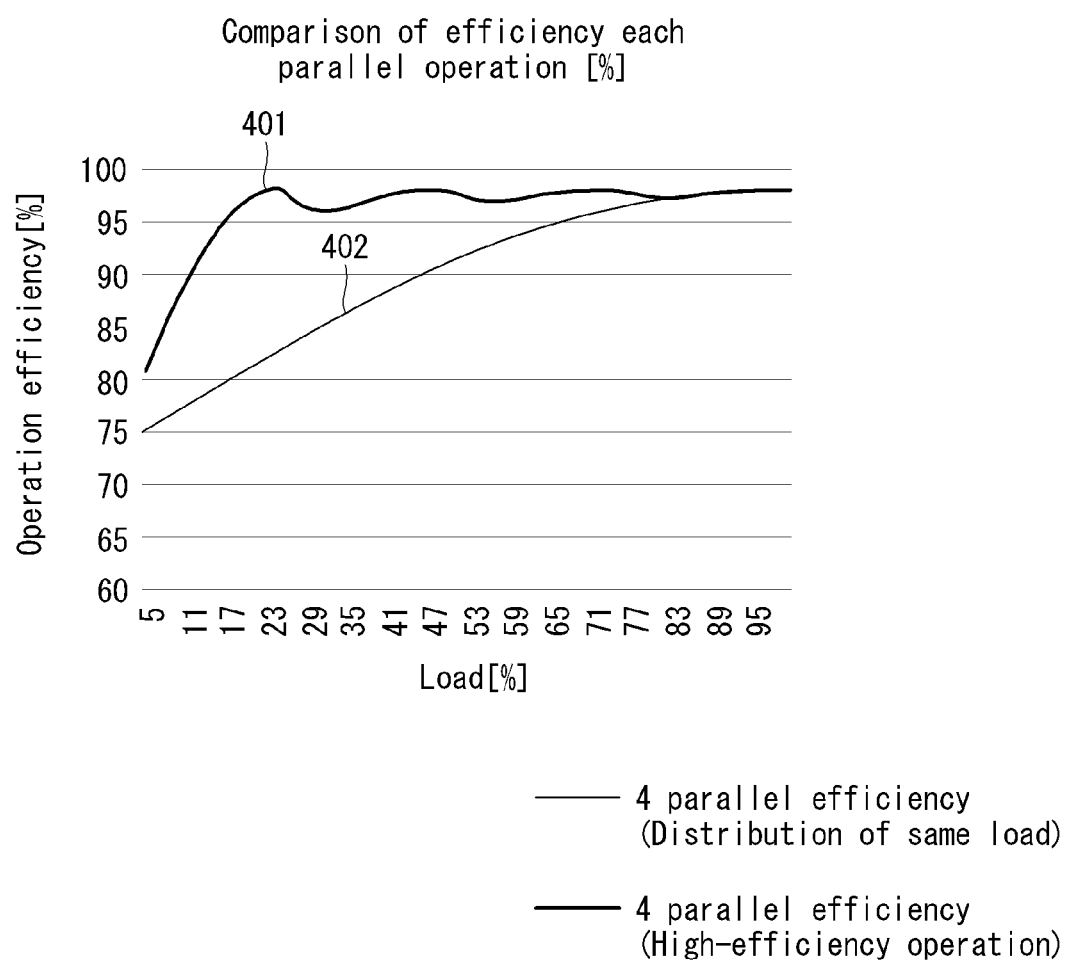
FIG. 4 is a graph comparing efficiency according to a load distribution method during parallel operation.

Description of FIG. 4

FIG. 4 is a graph comparing efficiency according to a load distribution method during parallel operation.

As shown in FIG. 4, the efficiency of parallel operation is higher compared to the same total load in a second case 401 in which the load is distributed to only some PCSs as shown in the right figure of FIG. 3 than in a first case 402 in which the same load is distributed to each PCS as shown in the left part of FIG. 3.

In general, since the PCS shows relatively high power efficiency at a high load, the PCS can obtain an effect of increasing system efficiency by reducing the number of PCS parallel operation units at a low load.

In the case of non-communication droop control, it is difficult to implement high-efficiency control that can be configured in this Master-Slave parallel control. Since the droop control shares the active power and the reactive power based on load voltage and frequency, it is difficult to implement a sequence of terminating only a few PCS at a low load.

In the case of a general PCS, the efficiency appears higher at a higher load than at a lower load, but in the case of such droop control, a load as small as the number of parallels is distributed to each PCS even at a low load, and thus there is a problem that the overall system efficiency is lowered.

A power control method for solving this will be described below with reference to FIGS. 5 and 6.

ESS of the Present Disclosure

The present disclosure proposes a droop curve capable of a high-efficiency control technique in parallel operation of an ESS PCS through a droop control.

The proposed droop control improves system efficiency at a light load (a load of 50% or less of the rating) by using a different droop curve for each group, and by configuring only a small PCS to operate at a low load.

Figure 5:
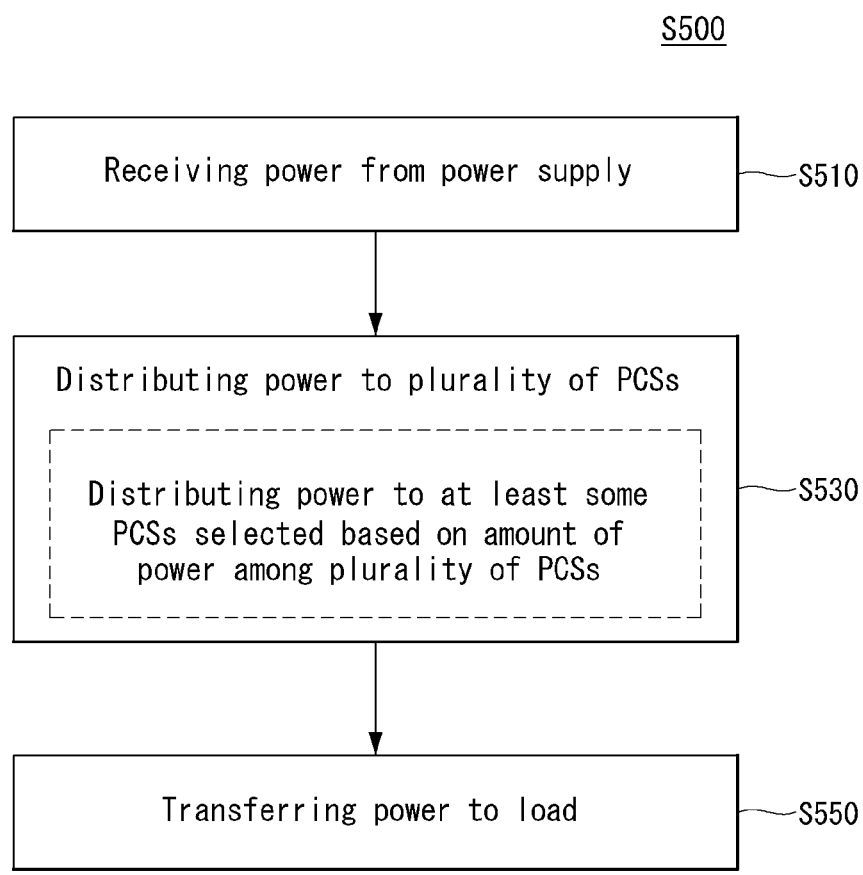
FIG. 5 is a flowchart illustrating a power control method according to an embodiment of the present disclosure.

Description of FIG. 5

FIG. 5 is a flowchart illustrating a power control method according to an embodiment of the present disclosure.

As shown in FIG. 5, according to the embodiment of the present disclosure, a power control device may receive power from a power supply (S510).

Here, the power control device may be provided in at least one master PCS among a plurality of PCSs. In addition, the power control device may be provided in the form of a processor outside the PCSs.

Then, the power control device may distribute the power to the plurality of PCSs (S530).

Here, the power control device selects at least some PCSs based on a current total amount of the power among the plurality of PCSs. The power control device may distribute the power to at least some selected PCSs (S530).

Then, the power control device may transfer the power to the load using the distributed PCS (S550).

The general droop control parallel operation of the ESS PCS performs parallel operation based on the same droop curve, but the method proposed in the present disclosure is configured to have different operation characteristics for each section using various droop curves.

Figure 6:
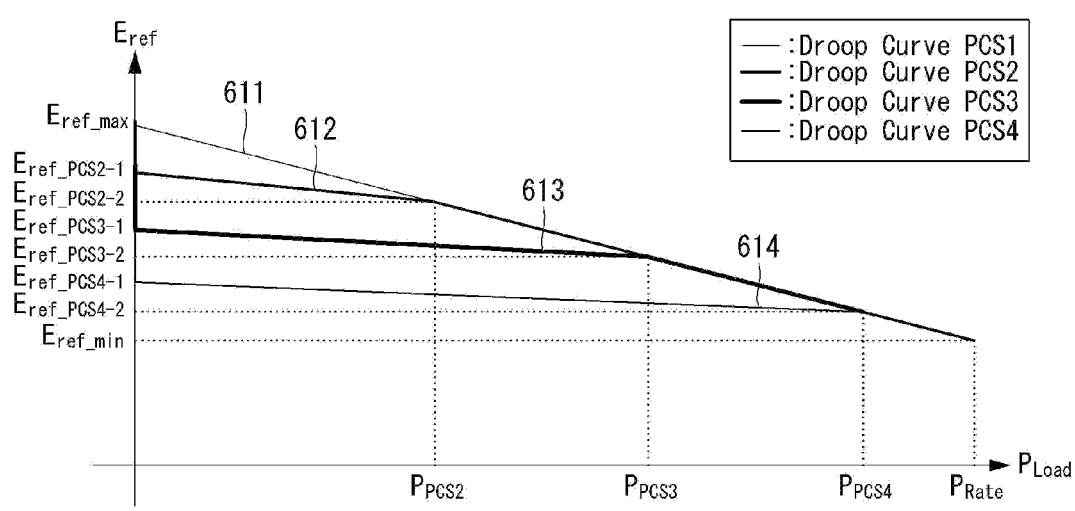
FIG. 6 illustrates droop curves for each section of the present disclosure.

Description of FIG. 6

FIG. 6 illustrates droop curves for each section of the present disclosure.

As shown in FIG. 6, a power control device may operate only some PCS based on a total power (PLOAD). Specifically, it is as follows.

First Section: $E_{ref\_max} \sim E_{ref\_PCS2-1}$

In a first section, the power control device selects only PCS1 from among a plurality of PCSs, and distributes a load active power only to the PCS1 based on a first droop curve 611.

In the first section, PCS2, PCS3 and PCS4 do not operate because active power distribution is 0.

Second Section: $E_{ref\_PCS2-1} \sim E_{ref\_PCS2-2}$

In a second section, the power control device distributes the load active power to the PCS2 with a second droop curve 612 having a lower slope than the droop curve of the PCS1.

In the second section, the power control device maintains the slope of the second droop curve with respect to the PCS2 while the power changes from 0 to PPCS2.

In the second section, the PCS3 and the PCS4 do not operate because the active power distribution is 0 during the corresponding section.

Third Section: $E_{ref\_PCS2-2} \sim E_{ref\_PCS3-1}$

In a third section, the PCS2 distributes the load active power with the same first droop curve as the PCS1.

In the third section, the PCS3 and the PCS4 do not operate because the active power distribution is 0 during the corresponding section.

Fourth Section: $E_{ref\_PCS3-1} \sim E_{ref\_PCS3-2}$

In a fourth section, the power control device distributes the load active power to the PCS3 with a third droop curve 613 having a lower slope than the first droop curve applied to the PCS1.

In the fourth section, the power control device applies the third droop curve to the PCS3 while the power increases to PPCS3.

In the fourth section, the PCS4 does not operate because the active power distribution is 0 during the corresponding section.

Fifth Section: $E_{ref\_PCS3-2} \sim E_{ref\_PCS4-1}$

In a fifth section, the power control device distributes the load active power to the PCS3 by applying the first droop curve applied to the PCS1 and the PCS2.

In the fifth section, the PCS4 does not operate because the active power distribution is 0 during the corresponding section.

Sixth Section: $E_{ref\_PCS4-1} \sim E_{ref\_PCS4-2}$

In a sixth section, the power control device distributes the load active power to the PCS4 by applying a fourth droop curve having a lower slope than the first droop curve applied to the PCS1.

In the sixth section, the power control device applies the fourth droop curve with respect to the PCS4 while the power increases to PPCS4.

Seventh Section: $E_{ref\_PCS4-2} \sim E_{ref\_min}$

In a seventh section, the power control device distributes the active power to the PCS4 by applying the same first droop curve as the PCS1, the PCS2 and the PCS3.

Excellence of ESS of the Present Disclosure

According to the present disclosure, the ESS can expect higher light load efficiency than the conventional method while using the non-communication droop control. In addition, when a low load is applied during parallel operation, a method of non-operating a certain PCS can be standardized based on the load voltage and frequency.

Main Features of ESS of the Present Disclosure

The ESS of the present disclosure may select a droop curve to have a PCS that does not operate according to voltage and frequency in the non-communication droop control.

In the present disclosure, the ESS may operate not only a resistive droop curve but also an inductive droop curve.

In the present disclosure, the ESS may operate both a linear droop curve and another droop curve having a section maintaining zero power.

In the present disclosure, the ESS may perform all of the non-communication droop control of two or more as well as four parallels.

The contents of the present disclosure are not limited to the ESS, and may be applied to a single-phase inverter system as well as a three-phase inverter system.

The contents of the present disclosure may be applied not only to a two-level inverter, but also to a multilevel inverter system having three or more levels.

Some embodiments or other embodiments of the present disclosure described above are not mutually exclusive or distinct from one another. Some embodiments or other embodiments of the present disclosure described above may be used in combination with or combined with each configuration or function.

For example, it means that configuration A described in specific embodiments and/or drawings and configuration B described in other embodiments and/or drawings may be combined. In other words, even when the combination between the configurations is not described directly, it means that the combination is possible except when it is described that the combination is impossible.

The above detailed description should not be construed as limiting in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A control method of a power control device, comprising:
  receiving power from a power supply;
  distributing the power to at least one of a plurality of power conversion systems (PCSs); and
  transferring the power to a load using the at least one PCS,
  wherein the power is distributed based on a load amount of power of each of the plurality of PCSs,
  wherein the plurality of PCSs are divided into a plurality of groups,
  wherein the plurality of PCSs are divided into different groups in each section of a plurality of sections divided based on a bus voltage, and
  wherein a different droop curve is applied to each group.

2. The method of claim 1, wherein the power is distributed based on non-communication control.

3. The method of claim 2, wherein the non-communication control is droop control.

4. The method of claim 1, wherein the droop curves include at least one resistive droop curve or at least one inductive droop curve.

5. The method of claim 1, wherein the droop curves include at least one droop curve with a linear first droop curve section, and a second droop curve section that maintains zero power.

6. The method of claim 1, wherein a number of the plurality of PCSs is two or more, and
  wherein the plurality of PCSs are operated in parallel.

7. The method of claim 1, wherein the power control device is included in an energy storage system (ESS).

8. The method of claim 1, wherein the power control device is included in an inverter system having one or more phases.

9. The method of claim 1, wherein the power control device is included in an inverter system having two or more levels.

10. The method of claim 1, wherein, in a first section of the plurality of sections, all of the power is distributed to a first PCS among the plurality of PCSs.

11. The method of claim 10, wherein, in a second section of the plurality of sections, the power is distributed to (i) the first PCS by a first ratio and (ii) a second PCS among the plurality of PCSs by a second ratio, the second ratio being different from the first ratio, and
  wherein, in a third section of the plurality of sections, the power is distributed to the first PCS and the second PCS by a same ratio.

12. The method of claim 11, wherein, in a fourth section of the plurality of sections, the power is distributed to (i) the first PCS and the second PCS by a third ratio and (ii) a third PCS by a fourth ratio that is lower than the third ratio, and
  wherein, in a fifth section of the plurality of sections, the power is distributed to the first PCS, the second PCS, and the third PCS by a same ratio.

13. The method of claim 12, wherein, in a sixth section of the plurality of sections, the power is distributed to (i) the first PCS, the second PCS, and the third PCS by a fifth ratio and (ii) a fourth PCS by a sixth ratio that is lower than the fifth ratio, and
  wherein, in a seventh section of the plurality of sections, the power is distributed to the first PCS, the second PCS, the third PCS, and the fourth PCS by a same ratio.

14. A power control device, comprising:
  a processor configured to:
    receive power from a power supply;
    distribute the power to at least one of a plurality of power conversion systems (PCSs); and
    transfer the power to a load using the at least one PCS,
    wherein the power is distributed based on a load amount of power of each of the plurality of PCSs,
    wherein the plurality of PCSs are divided into a plurality of groups,
    wherein the plurality of PCSs are divided into different groups in each section of a plurality of sections divided based on a bus voltage, and wherein a different droop curve is applied to each group.

15. The device of claim 14, wherein, in a first section of the plurality of sections, all of the power is distributed to a first PCS among the plurality of PCSs.

16. The device of claim 15, wherein, in a second section of the plurality of sections, the power is distributed to (i) the first PCS by a first ratio and (ii) a second PCS among the plurality of PCSs by a second ratio, the second ratio being different from the first ratio, and wherein, in a third section of the plurality of sections, the power is distributed to the first PCS and the second PCS by a same ratio.

17. The device of claim 16, wherein, in a fourth section of the plurality of sections, the power is distributed to (i) the first PCS and the second PCS by a third ratio and (ii) a third PCS by a fourth ratio that is lower than the third ratio, and wherein, in a fifth section of the plurality of sections, the power is distributed to the first PCS, the second PCS, and the third PCS by a same ratio.

18. The device of claim 17, wherein, in a sixth section of the plurality of sections, the power is distributed to (i) the first PCS, the second PCS, and the third PCS by a fifth ratio and (ii) a fourth PCS by a sixth ratio that is lower than the fifth ratio, and wherein, in a seventh section of the plurality of sections, the power is distributed to the first PCS, the second PCS, the third PCS, and the fourth PCS by a same ratio.

19. A control method of a power control device in an energy storage system (ESS), comprising:

receiving power from a power supply;

selecting at least one of a plurality of power conversion systems (PCSs) based on a load amount of power of each of the plurality of PCSs;

distributing the power to the selected at least one PCS; and transferring the power to a load using the at least one PCS, wherein the plurality of PCSs are divided into a plurality of groups, wherein the plurality of PCSs are divided into different groups in each section of a plurality of sections divided based on a bus voltage, and wherein a different droop curve is applied to each group.

* * * * *